(12) United States Patent
Lockyer

(10) Patent No.: US 6,172,606 B1
(45) Date of Patent: *Jan. 9, 2001

(54) NETWORK SECURITY

(75) Inventor: Terry Lockyer, Bedford (GB)

(73) Assignee: 3COM Technologies (KY)

( * ) Notice: Under 35 U.S.C. 154(b), the term of this patent shall be extended for 0 days.

This patent is subject to a terminal disclaimer.

(21) Appl. No.: 09/326,769

(22) Filed: Jun. 4, 1999

Related U.S. Application Data

(63) Continuation-in-part of application No. 09/113,782, filed on Jul. 10, 1998, now Pat. No. 6,064,305.

(51) Int. Cl.[7] .................................................. G08B 13/12
(52) U.S. Cl. ............................................................. 340/568.2
(58) Field of Search .............................. 340/568.2, 652, 340/653, 540, 687

(56) References Cited

U.S. PATENT DOCUMENTS

| | | | |
|---|---|---|---|
| 5,406,260 | * | 4/1995 | Cummings et al. .............. 340/568.2 |
| 5,578,991 | * | 11/1996 | Scholder .............................. 340/571 |
| 5,715,174 | * | 2/1998 | Cotichini et al. ................ 364/514 R |
| 5,821,868 | * | 10/1998 | Kuhling ................................ 340/649 |
| 5,926,091 | * | 7/1999 | Svensson et al. ................. 340/568.2 |
| 6,064,305 | * | 5/2000 | Lockyer ............................ 340/568.2 |

* cited by examiner

*Primary Examiner*—Jeffrey A. Hofsass
*Assistant Examiner*—Sihong Huang
(74) *Attorney, Agent, or Firm*—David J. Weitz; Wilson Sonsini Goodrich & Rosati

(57) ABSTRACT

An alarm or monitoring system for a computer network in which network devices are able to be "locked" onto the network, in which condition an alarm is raised if the device is removed. This occurs even when the device is switched off, as the monitoring of the presence of the device is performed by the network. Alternatively, the device may be "unlocked" from the network, in which condition no alarm is raised even if the device is removed. Control of whether a particular network device is subject to the alarm system is therefore in the hands of the user of the device and this is particularly useful for items such as lap-top computers which may quite legitimately be regularly connected to and disconnected from the network.

21 Claims, 2 Drawing Sheets

NETWORK SECURITY

This application is a continuation in part of Ser. No. 09/113,782 filed Jul. 10, 1998; now U.S. Pat. No. 6,064,305 issued May 16, 2000.

This application claims the benefit of priority to British application Ser. No. not yet assigned, filed May 29, 1999, which is incorporated herein by reference in its entirety.

BACKGROUND OF THE INVENTION

1. Field of the Invention

The present invention relates to the security of network devices within a computer network.

2. The Prior Art

As is well known, a computer network is formed of a plurality of network devices, such as computers, printers, file servers, etc., which are interconnected such that data communications may pass between the network devices. This functionality may typically be provided by using one or more communication hubs, each having a number of ports to each of which a network device may be connected. In the case where more than one hub is used, a link is provided from each of these to another also via ports on the hubs. In this fashion the network devices are interconnected in a star or tree topology with the communication hubs being the nodes in the arrangement.

Each network device in this topology is therefore connected to the network via a single data cable, which is connected to a port on one of the communication hubs which in turn provides access for that device to the rest of the network devices.

The physical items forming such a network may be numerous and may be spread over a wide area, for instance in an office environment. Also, network devices such as computers are typically quite high value items and thus susceptible to be stolen or otherwise removed without authority. It would however be impractical and perhaps prohibitively expensive to conduct physical checks on the network devices except in the smallest network installation.

For these reasons there have been previously proposed security or alarm systems which automatically monitor the presence of the network devices and provide a visual, audible or other indication upon the removal of a network device.

For instance, in U.S. Pat. No. 5,406,260 there is described a system and method for monitoring the connection of electronic equipment such as remote computer workstations, to a network via a communication link, and detecting the disconnection of the equipment from the network. This system includes current loops internally coupled to protected pieces of equipment and a low current power signal is provided to each of the current loops. Removal of a piece of protected equipment breaks the current flow through the associated current loop and an alarm can be activated.

In network equipment such as that designed for use in Ethernet 10 base T networks there is typically an isolated transformer provided on the data connection to the device, the primary coil of which may be used as the current loop which will be broken on removal of the network device.

In WO97/09667 a different approach to the monitoring of a computer system is described. In this arrangement, each of the monitored computers continuously collects information about itself and supplies the information to a separate alarm centre. The alarm centre activates an alarm if the collected information changes by a significant amount over time. This system thus relies on the presence of active local intelligence in the monitored computers.

WO96/29638 describes a further alarm system for network connected computer equipment. In this arrangement each workstation is provided with an alarm unit which can communicate alarm signals to an alarm centre to indicate an alarm condition.

In these latter two examples of the prior art it is necessary for the monitored equipment to be powered-up all the time during which monitoring takes place while in the first mentioned document above and in the latter two there is no detailed discussion of the control of the system in particular relating to how the system is armed. The whole network is monitored whenever the alarm system is in operation.

SUMMARY OF THE INVENTION

In a first aspect, the present invention provides a computer network arranged to interconnect a plurality of network devices, comprising:

a communications hub comprising a plurality of ports to each of which a said network device may be connected, each port providing electrical connections arranged for the transmission and reception of data, and detection means associated with each of said ports and arranged to be responsive to an alteration in the electrical characteristics presented by said electrical connections, which alteration is indicative, in use, of the removal of a network device from connection to the port, management means arranged to receive, in use, indications from users of network devices connected to said communications hub of whether the removal of specific ones of said network devices is to be monitored, and alarm means arranged to provide an indication in the event that said detection means detects the removal of a network device for which the management means has received an indication that its removal should be monitored.

In a second aspect the present invention provides a computer network monitoring means for use in a computer network which interconnects a plurality of network devices and comprises a communications hub having a plurality of ports to each of which a said network device may be connected, each port providing electrical connections for the transmission and reception of data, the monitoring means comprising:

detection means associated with ports in said communications hub and arranged to be responsive to an alteration in the electrical characteristics presented by said electrical connections at each respective port, which alteration is indicative, in use, of the removal of a network device from connection to the port, management means arranged to receive, in use, indications from users of network devices connected to said communications hub of whether the removal of specific ones of said network devices is to be monitored, and alarm means arranged to provide an indication in the event that said detection means detects the removal of a network device for which the management means has received an indication that its removal should be monitored.

In this invention a user is responsible for and in control of the security of his or her own equipment. This facilitates a more mobile work style and also enables a more flexible security arrangement than may be possible with centralised control which may not be able to provide individual control for each network item.

In the preferred embodiment, at least some of the network devices are provided with user interface means by which the users may send the monitoring indications to the management means. Preferably, users may send indications from a network device which has an interface concerning whether that device is to be monitored by the system. Additionally, users may be able to send indications concerning whether other network devices, in particular ones which do not have a user interface, should be monitored. In particular, a user of a pc may be able to control from that pc whether removal of associated equipment such as a printer or scanner is to be monitored, in addition to controlling whether removal of the pc itself should be monitored.

In the preferred arrangement, the electrical characteristic which is sensed is the presence or absence of a winding in a conventional isolation transformer provided at the network device. This arrangement means that there is no additional circuitry required in the network device to enable the implementation of the invention.

Advantageously then, in the present invention, a user of the network device can specify whether that device should be subject to the alarm system without having to make specific personal contact with the system administrator.

Also the alarm utilises the data cables which removes any need for specific cable installation and the system is further sensitive to the removal of the devices which are switched off.

BRIEF DESCRIPTION OF THE DRAWINGS

The present invention will be better understood from the following description of preferred embodiments given by way of example and with reference to the accompanying drawings, in which.

DETAILED DESCRIPTION OF THE DRAWINGS

In broad terms, this invention provides an alarm or monitoring system for a computer network in which network devices are able to be "locked" onto the network, in which condition an alarm is raised if the device is removed. This occurs even when the device is switched off, as the monitoring of the presence of the device is performed by the network. Alternatively, the device may be "unlocked" from the network, in which condition no alarm is raised even if the device is removed. Control of whether a particular network device is subject to the alarm system is therefore in the hands of the user of the device and this is particularly useful for items such as lap-top computers which may quite legitimately be regularly connected to and disconnected from the network.

Figure 1:
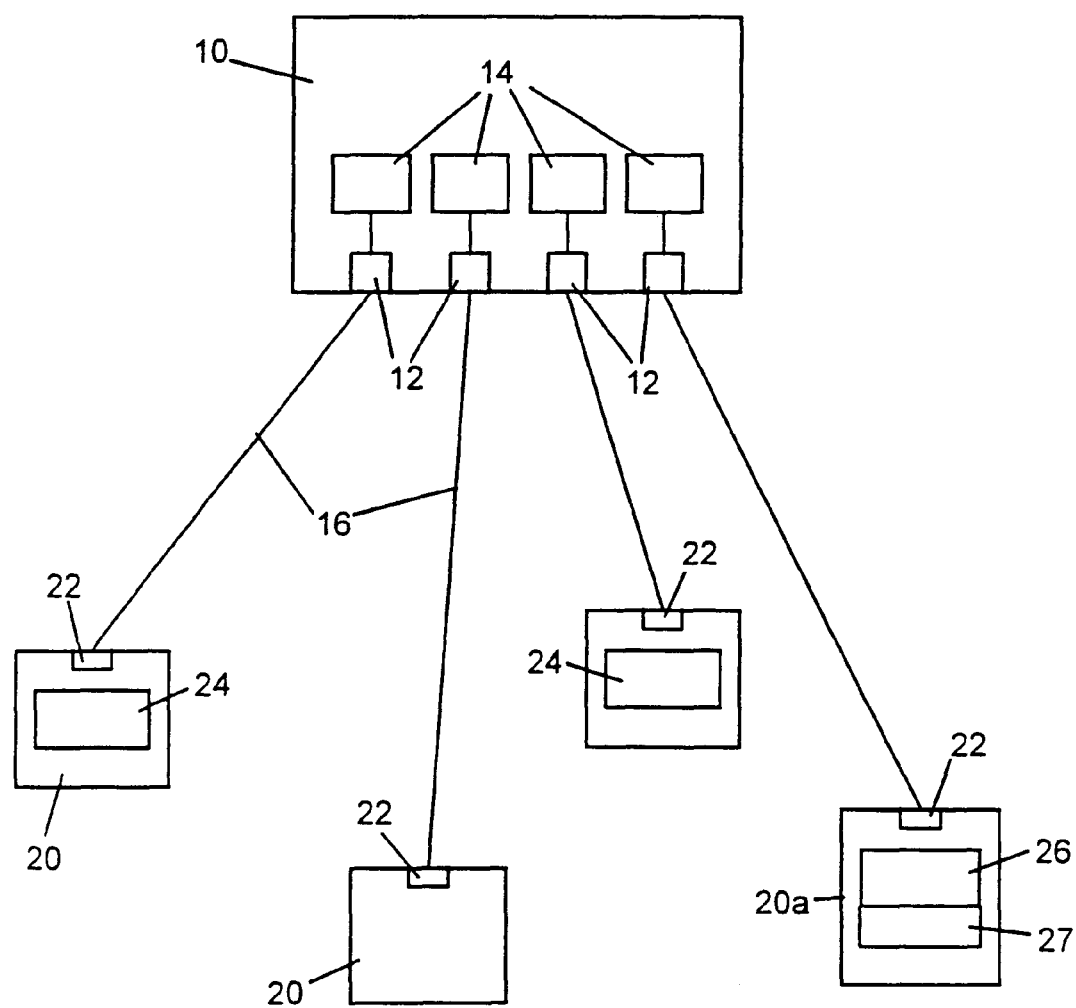
FIG. 1 is a schematic illustration of a network according to the preferred embodiment.

FIG. 1 illustrates in schematic form a network operating according to an embodiment of the present invention. The network comprises a plurality of network devices 20 interconnected by way of a communications hub 10 in the normal way. In particular communications hub 10 is provided with a plurality of ports 12 and each network device 20 is connected to one of the ports 12 on communications hub 10 by way of a cable 16. As is well known, communications hub 10 retransmits communications received at its ports to the others of its ports thereby enabling communications transmitted by any one of network devices 20 to reach desired other ones of the network devices 20. In the illustration of FIG. 1, only a few network devices and ports 12 are illustrated for clarity, it being understood that typically there would be many more network devices in a network and also more than four ports provided on a typical communications hub.

As illustrated in FIG. 1 there is associated with each port 12 a monitoring means 14 which monitors the presence or otherwise of a network device connected to the respective port 12. To enable this monitoring to take place, there is provided within each network device 20 a complementary means 22, the presence of which can be sensed by the monitoring means 14. In this invention, the presence or otherwise of the network devices 20 may be monitored even when the network device is switched off and thus means 22 is a passive device which can give a predetermined response even in the absence of a local power supply.

As will be described in more detail below, in the preferred arrangement means 22 is simply the primary winding of an isolation transformer provided at the input port of network device 20. In this case, monitoring means 14 is circuitry which detects the presence or otherwise of an available current loop via the appropriate conductors in cable 16 connected to that primary winding.

This is however merely an exemplary way in which the passive monitoring may be carried out and other arrangements which enable the monitoring of the presence of network device 20 even when the device is not switched on fall within the scope of this invention.

In the system of this invention, there is also provided control means for controlling the operation of the monitoring means 14. In the illustrated embodiments this is provided in a network device 20a which is designated a management device. This management device may be a computer used by the system administrator or may, for instance, be a dedicated device connected to the network. Alternatively, the management functions may be incorporated within communications hub 10.

In any event, under the control of the control means 26 each monitoring means 14 is either operative to monitor the presence or otherwise of a device connected to the respective port 12 or is not operative. When monitoring means 14 is operative and a disconnection is sensed, an indication of this is sent to control means 26 or alarm means 27, described later.

Some of network devices 20 further comprise local control means 24 which communicates with control means 26. If it is desired that a particular one of these network devices 20 should be subject to monitoring, the respective local control means 24 is arranged to communicate this to control means 22 which in turn activates the respective monitoring means 14. If it is subsequently desired that the particular network device 20 should not be subject to monitoring, local control means 24 is arranged to communicate this to control means 26 which in turn takes the necessary action. This may involve preventing the respective monitoring means 14 from monitoring the associated network device 20, or it may mean that any indications of the removal of the network device given by respective monitoring means 14 will be ignored.

Others of network devices 20 may not be provided with local control means, as shown in one of the network devices 20 in FIG. 1. These may be for instance printers or scanners connected to the network, or other devices which may not have a user interface. These devices may be included in the monitoring under the control of a local control means 24 in another network device 20, for instance a computer associated with the device.

Thus each local control means 24 is arranged to communicate to control means 26 whether its own network device 20 is to be monitored and may also be arranged to communicate to control means 26 whether other network devices 20 (which may or may not have their own local control means 24) are to be monitored.

Alarm means 27 is associated with control means 26 and is arranged to give an indication if it is determined that a network device 16 which is currently subject to monitoring is removed. That indication may for example be by way of visual or audible alarm, or an indication on the screen of the network administrator's computer, or alarm means 27 may be arranged to send a communication to another location where an alarm would be raised.

It will be seen therefore that the user of a network device 20 who will legitimately, remove the network device 20 from the network has a convenient mechanism by way of which he can prevent that removal from causing an alarm. This may be particularly useful for items such as lap-top computers which may sometimes be removed from the office by their users, for instance overnight, when such removal should not raise any alarm, while on other occasions it may be desired to leave the item connected to the network even after it is switched off and in this case it is useful for the device to remain monitored by the network such that any removal would be assumed to be unauthorised and therefore raise an alarm.

The local control means 24 may conveniently be implemented as software and may usefully be caused to activate during the shutdown routine of a computer. This will ensure that each time the computer is switched off an indication is first given to control means 26 of whether that device is to be monitored or not during the time it is not active on the network. The local control means 24 may be arranged such that it defaults to one or another of its two conditions in the absence of any indication by the user that the other condition is required.

Alternatively, local control means may be in the form of a device such as a key and lock device, the position of which indicates whether the network device may be removed.

Figure 2:
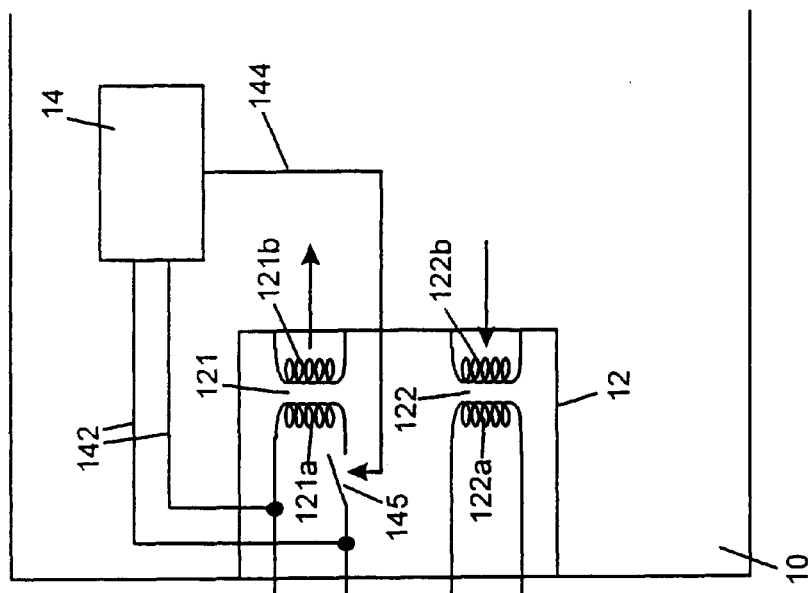
FIG. 2 illustrates the connection of a network device to the network.
Figure 2:
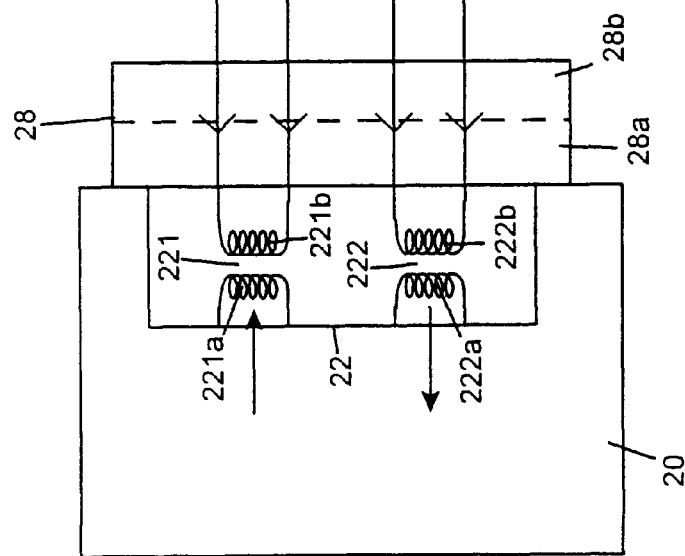

FIG. 2 illustrates in diagrammatic form some of the physical connections between network device 20 and communication hub 10 which are useful for understanding the operation of the present invention. In FIG. 2 the same reference numerals are used as those in FIG. 1 for designating corresponding parts.

As mentioned above in connection with FIG. 1, network device 20 is provided with port 22 by way of which connection is made to communication hub 10 and the remainder of the network. Port 22 includes first and second isolation transformers 221, 222 by way of which data is respectively transmitted and received. Within cable 16 there are provided two pairs of cables 161, 162 and these are connected respectively to transformers 121, 122 in port 121 of communications hub 10. It will be appreciated that data applied by network device 20 to winding 221a of transformer 221 as a time varying signal is inductively coupled to winding 221b and is therefore carried by wires 161 to winding 121a of transformer 121 where it is inductively coupled to winding 121b and is thus received by communications hub 10. A corresponding sequence of events occurs via transformer 122, wires 162 and transformer 222 when data is sent from communications hub 10 to network device 20.

This arrangement is in itself a well-known arrangement and the isolation transformers 221, 222, 121, 122 are provided in the transmit and receive paths to provide electrical isolation between the various parts of the network while still allowing the data communications to pass.

Cable 16 is physically connected to port 22 of network device 20 by way of a connection device 28 having two parts 28a, 28b in the form of a plug and socket connector.

As mentioned above, within the communication device 10 there is provided monitoring means 14 which is arranged to detect the presence or otherwise of a connected network device 20. Monitoring means 14 is connected, in this embodiment, by way of a pair of connections 142 to the pair of wires 161. There is also optionally provided switch means 145 in one of the lines 161 which is controlled by monitoring means 14 via lines 144. These connections enable the monitoring by monitoring means in a number of possible ways, some of which will be outlined in the following.

Firstly, it may be preferred that monitoring means 14 should only undertake active monitoring of lines 161 during times that network device 20 is actually switched off. This will ensure that any active monitoring conducted by monitoring means 14 does not interfere with the proper passage of data via lines 161. In a typical network, network devices 20 are arranged to transmit periodic link pulses all of the time they are switched on to enable communications device 10 to sense their presence and monitoring means 14 may also be directly responsive to these link pulses monitored by way of 142 or may be responsive to a control signal generated within communications hub 10 so as to be essentially inactive during the times the link pulses are being received. In this condition, the presence of network device 20 can of course be determined by the occurrence of the link pulses and, if monitoring means 14 is set to monitor the presence of network device 20 during a time when network device 20 is switched on, monitoring means 14 can cause an alarm to be raised simply if the expected link pulses no longer appear.

More significantly, monitoring means 14 is also arranged to sense the presence or otherwise of network device 20 when network device 20 is switched off. In broad terms, this can be achieved by using lines 142 to determine the apparent impedance appearing between them or otherwise applying signals via lines 142 and determining the response.

In one embodiment, when it is determined that network device 20 is switched off, monitoring means 14 can, via line 144, open switch device 145. Once this is done, monitoring means 14 simply determines the presence or otherwise of a current path between the two lines 142 and on the basis of this determination detects the presence or otherwise of network device 20. In particular, it will be appreciated that, in the presence of network device 20, there is a current path between the lines 142 provided by the pair of lines 141 and the winding 221b. If network device 20 is removed either by way of disconnection of connector 28 or otherwise breaking the physical link provided by cable 16 this current path will be broken by the removal of winding 221b. This breaking can be detected by monitoring means 14 which may, as a result, cause an alarm to be raised.

Alternatively, in the absence of switch means 145, monitoring means 14 may simply be responsive to the difference in impedance presented to lines 142 between the condition in which network device 20 is present, in which case windings 121a and 221b are connected in parallel between lines 142, and the condition in which network device 20 is absent when the impedance is only that of winding 121a.

It will be appreciated that many variations on the monitoring means outlined above are possible within the scope of this invention. For instance, it may be that monitoring means 14 is connected to lines 162 instead of lines 161 and thereby conduct its monitoring via the current loop provided by inductor 222b.

As mentioned above, in one embodiment the control means and alarm means are provided within the communications hub and may be integrated with the monitoring means.

Alternatively, as illustrated, the control means and alarm means may be provided at a separate location. In this case the indications from the monitoring means are preferably sent via the network according to the standard network communication protocol. This also enables the control and alarm means to be responsive to signals from more than one hub and therefore monitor the security of a larger network.

What is claimed is:

1. A computer network arranged to interconnect a plurality of network devices, comprising:
   a communications hub comprising a plurality of ports to each of which a said network device may be connected, each port providing electrical connections arranged for the transmission and reception of data, and detection means associated with each of said ports and arranged to be responsive to an alteration in the electrical characteristics presented by said electrical connections, which alteration is indicative, in use, of the removal of a network device from connection to the port,
   management means arranged to receive, in use, indications from users of network devices connected to said communications hub of whether the removal of specific ones of said network devices is to be monitored, and
   alarm means arranged to provide an indication in the event that said detection means detects the removal of a network device for which the management means has received an indication that its removal should be monitored.

2. A computer network according to claim 1 further comprising user interface means associated with a said network device arranged to send said indications of whether removal of that network device is to be monitored.

3. A computer network according to claim 2 in which said user interface means is arranged to send said indications of whether removal of at least one other of said network devices is to be monitored.

4. A computer network according to claim 1 in which said detection means is arranged to be responsive to an alteration in the electrical characteristics presented by a pair of said electrical connections.

5. A computer network according to claim 4 in which said detection means is arranged to sense the presence or absence of a current path between said pair of said electrical connections external to said communications hub.

6. A computer network according to claim 5 in which said detection means comprises switch means arranged to disconnect circuitry internal to said communications hub providing a current path between said pair of said electrical connections.

7. A computer network according to claim 1 in which said management means and said alarm means are provided within said communications hub.

8. A computer network according to claim 1 in which at least one of said management means and alarm means is provided separate from said communications hub and is in communication with said communications hub via the network.

9. A computer network according to claim 1 in which a said network device, the removal of which is to be monitored, comprises a port providing electrical connections arranged for the transmission and reception of data, and passive circuitry defining a predetermined electrical characteristic between a predetermined pair of said electrical connections.

10. A computer network according to claim 9 in which said circuitry comprises a winding forming part of an isolation transformer in said port.

11. A computer network monitoring means for use in a computer network which interconnects a plurality of network devices and comprises a communications hub having a plurality of ports to each of which a said network device may be connected, each port providing electrical connections for the transmission and reception of data, the monitoring means comprising:
    detection means associated with ports in said communications hub and arranged to be responsive to an alteration in the electrical characteristics by said electrical connections at each respective port, which alteration is indicative, in use, of the removal of a network device from connection to the port,
    management means arranged to receive, in use, indications from users of network devices connected to said communications hub of whether the removal of specific ones of said network devices is to be monitored, and
    alarm means arranged to provide an indication in the event that said detection means detects the removal of a network device for which the management means has received an indication that its removal should be monitored.

12. A computer network monitoring means according to claim 11 further comprising user interface means associated with a said network device arranged to send said indications of whether removal of that network device is to be monitored.

13. A computer network monitoring means according to claim 12 in which said user interface means is arranged to send said indications of whether removal of at least one other of said network devices is to be monitored.

14. A computer network monitoring means according to claim 11 in which said detection means is arranged to be responsive to an alteration in the electrical characteristics presented by a pair of said electrical connections.

15. A computer network monitoring means as claimed in claim 14 in which said detection means is arranged to sense the presence or absence of a current path between a selected pair of said electrical connections external to said communications hub.

16. A computer network monitoring means as claimed in claim 15 in which said detection means comprises switch means arranged to disconnect circuitry internal to said communications hub providing a current path between said selected pair of electrical connections.

17. A computer network monitoring means as claimed in claim 11 in which said management means and alarm means are provided within said communications hub.

18. A computer network monitoring means as claimed in claim 11 in which at least one of said management means and alarm means is provided separate from said communications hub and, in use, is in communication with said communication hub via the computer network.

19. A computer network device for use with monitoring means according to claim 11 comprising a port providing electrical connections arranged for the transmission and reception of data, passive circuitry means defining a predetermined electrical characteristic between a predetermined pair of said electrical connections, and means for transmitting an indication of whether the removal of the network device is to be monitored.

20. A network device according to claim 19 in which said circuitry means comprises a winding forming part of an isolation transformer in said port.

21. A computer network to interconnect a plurality of network devices, comprising:

a communications hub, including:

a plurality of ports to which said plurality of network devices may be coupled, each port of the plurality of ports providing electrical connections for at least one of transmission and reception of data; and a detection circuit associated with the plurality of ports, and said detection circuit responsive to an alteration in electrical characteristics presented by said electrical connections, and said alteration is indicative of a removal of a network device of said plurality of network devices from connection to a corresponding one of said plurality of ports;

a management circuit coupled to said communications hub, and the management circuit for receiving indications, from users of said plurality of network devices, of whether the removal is to be monitored, and an alarm circuit to provide an indication in the event that said detection circuit detects the removal, for which the management circuit has received an indication that the removal should be monitored.

* * * * *